US011947540B1

(12) United States Patent
Giuliano et al.

(10) Patent No.: US 11,947,540 B1
(45) Date of Patent: Apr. 2, 2024

(54) QUERY LANGUAGE FOR METRIC DATA

(71) Applicant: Amazon Technologies, Inc., Seattle, WA (US)

(72) Inventors: Andrea Giuliano, Dublin (IE); Gianluca Cacace, Dun Laoghaire (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/855,629

(22) Filed: Jun. 30, 2022

(51) Int. Cl.
*G06F 16/2453* (2019.01)

(52) U.S. Cl.
CPC .............................. *G06F 16/24549* (2019.01)

(58) Field of Classification Search
CPC ................................................ G06F 16/24549
See application file for complete search history.

(56) References Cited

U.S. PATENT DOCUMENTS

| | | | |
|---|---|---|---|
| 2012/0124045 A1* | 5/2012 | Pendap | G06F 16/2456 |
| | | | 707/E17.089 |
| 2020/0341956 A1* | 10/2020 | Bayer | G06F 16/219 |
| 2020/0410009 A1* | 12/2020 | Kolev | G06F 16/2433 |
| 2023/0177046 A1* | 6/2023 | Christoph | G06F 16/289 |
| | | | 707/715 |

* cited by examiner

*Primary Examiner* — William Spieler
(74) *Attorney, Agent, or Firm* — Davis Wright Tremaine LLP

(57) ABSTRACT

Techniques and systems can receive a query identifying a name linked to performance data of a computer system and a location of the performance data. The name linked to the performance data of the computer system and the location of the performance data can be communicated to a first computer-implemented system. The first computer-implemented system can include identifying data derived from the name and the location of the performance data. Identifying data derived from the name and the location of the performance data can be received from the first computer-implemented system. The identifying data derived from the name and the location of the performance data can be used to retrieve the performance data. The performance data can be hosted by a second computer-implemented system that is different than the first computer-implemented system.

20 Claims, 7 Drawing Sheets

… (1)

QUERY LANGUAGE FOR METRIC DATA

BACKGROUND

The technical field of collecting, storing, and processing metric data has become of enormous interest to many organizations and a cornerstone in the optimization of new and future products/technology. Organizations now seek to use metric data to provide insight on a variety of issues, such as optimizing aspects of their products, speed, and customer experience. Although the high-level view of the processes involving the retrieval, collection, storage, and processing of metric data may seem trivial, implementing a robust, fast, and efficient metric data datastore is tremendously complex. Moreover, even the most skilled in the art have difficulty in developing reliable architectures to optimize queries on metric data due to, for example, issues created by metadata retrieval, collection, and storage.

BRIEF DESCRIPTION OF THE DRAWINGS

Various techniques will be described with reference to the drawings, in which.

DETAILED DESCRIPTION

Figure 1:
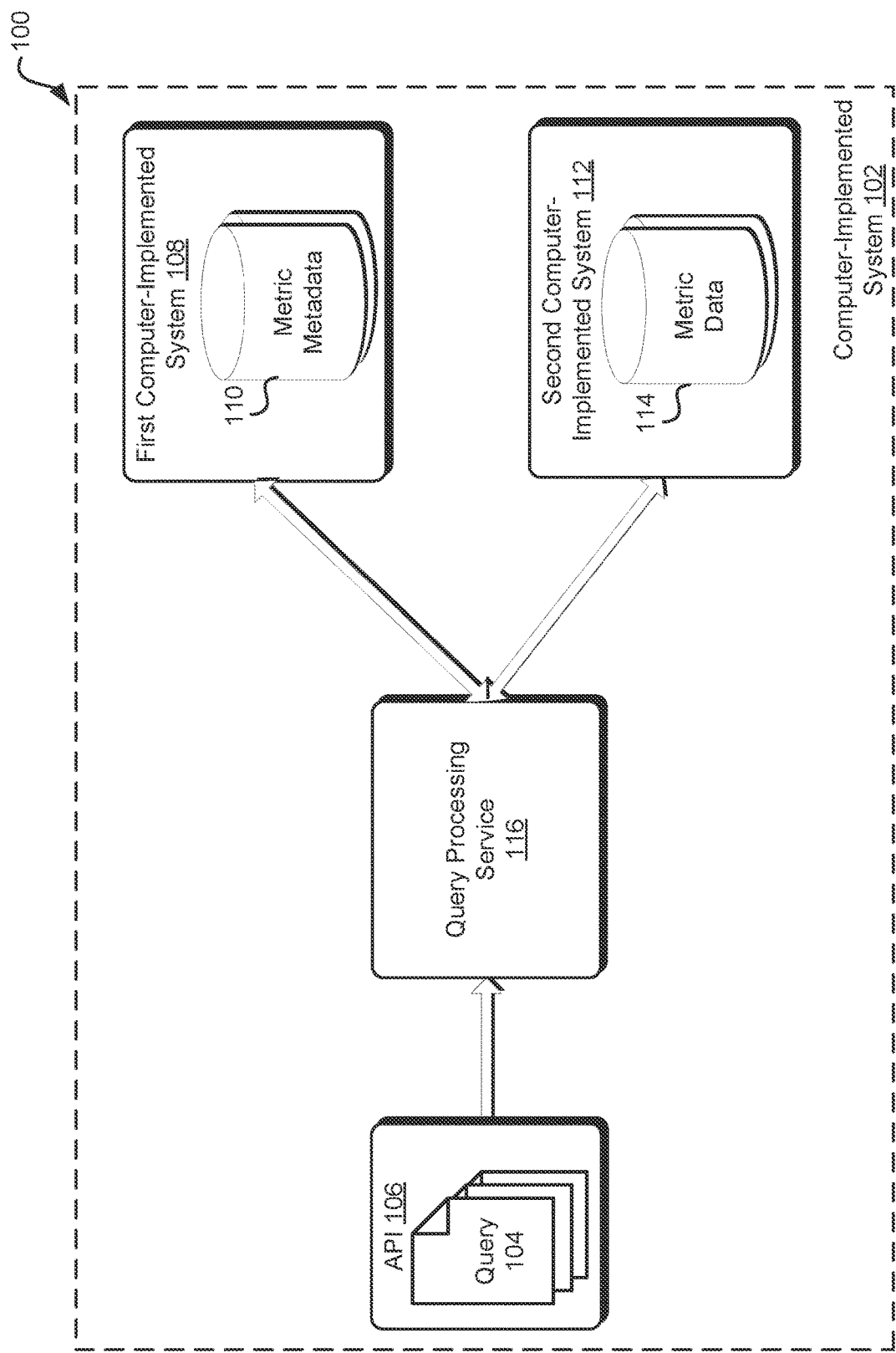
FIG. 1 illustrates an example system environment that can process queries, according to at least one embodiment.

A hybrid Structured Query Language (SQL) based query language and engine provide customers of an online service provider the ability to efficiently segment, aggregate, and compare queried metric data, which may be stored within a metric data repository or storage. The hybrid SQL based query language and engine are introduced at least as a result of core changes in current metrics repository architecture and improvements on how data and metadata are transported, processed, and stored across services. These optimizations are made through the utilization of many technologies, including but not limited to, the implementation of metadata binary index format, a serialization format, a dynamic caching of evolving blocks for time series metadata, and a real-time search. The use of metadata storage solutions is becoming increasingly preferred by organizations due to the explosion in the size and number of metric data being maintained by those entities.

The described systems and techniques provide rapid and efficient query of data, through the use of the hybrid SQL language, where the data is stored in a first computer-implemented storage and metadata associated with the data is stored in the second computer-implemented storage. The data can be generated based on monitored use of computer systems. For example, the metric data can include processor utilization data, network usage data, storage disk reads and writes data, and so forth. The metadata associated with the metric data can include metric names associated with the data generated based on the monitoring of the computer systems. Furthermore, the metadata associated with the metric data can include location information indicating where the data generated, based on monitoring the use of the computer systems, is stored or hosted in computer-implemented storage. In some examples, the metadata can include a hash value determined from a hashing formula that receives one or more strings corresponding to the metric name and a location that is storing metric data associated with the metric name.

A user can use a user interface to define parameters of the hybrid SQL language, which can be processed by a system of the online service provider to query computer-implemented storage that host metric data and metadata of the metric data. In another example, the hybrid SQL language with user-defined parameters can be embedded in an application programming interface (API). The system can interface with a computer-implemented storage that includes metadata of metric data. Furthermore, the system can interface with a computer-implemented storage that includes the metric data. The metric data can be distributed over many computer-implemented storages. In some implementations, the metadata includes hash values generated from at least metric data names and data structure names that store the metric data. The data structures can be tables that contain metric data. The tables can have columnar format, where each column can be referred herein as a dimension and have an associated dimension identifier.

The hybrid SQL language can include a plurality of sections or portions. One portion can include a select statement. The select statement allows customers to define the metric name of the metric data they want to obtain, along with an aggregate function, identified by a function name, to be applied to all the metric data observations matching the query. In an example, identification and use of the aggregate function can be optional. Another portion of the hybrid SQL language can include a from statement. The from statement allows customers to define a namespace associated with the metric data that they want to obtain. In one example, the namespace is a name of a data structure containing the metric data. In another example, the namespace is the name of a storage location containing the metric data. In yet another example, the namespace is the name of a schemeless or a schema defined table containing the metric data. The table can include one or more columns, and each one of the columns can have an associated identifier related to metric data. As described in the following, the hybrid SQL language can include additional sections or portions.

A user generated query, using the hybrid SQL language, can be received by a query processing system. The query processing system can be coupled to at least two computer-implemented storages. A first of the computer-implemented storages can host metadata associated with metric data. A second of the computer-implemented storages can host the metric data. In some examples, a plurality of computer-implemented storages can be used to host the metadata. Similarly, in some examples, a plurality of computer-implemented storages can be used to host the metric data. The user generated query can include at least a first portion including first data identifying a metric name. This metric name may be associated with performance data corresponding to at least one computer-implemented service provided by the online service provider. Furthermore, the user generated query can include a second portion including a second data identifying a name of a data structure comprising the performance data associated with the metric name identified in the first portion of the query.

The query processing system can parse the received user generated query. For example, the query processing system can parse the query to determine the metric name from the first data and the name of the data structure from the second data. In an example, the name of the data structure is associated with a table that hosts metric data. The query processing system can communicate the metric name and the name of the data structure to a first computer-implemented storage. The first computer-implemented storage can include metadata linked to metric data stored in a second computer-implemented storage. In at least one example, the metadata included in the first computer-implemented storage includes identifying data linked to the metric name and the name of the data structure. The identifying data can be derived from the metric name and the name of the data structure. For example, the identifying data can be a hash derived from the metric name and the name of the data structure. The first computer-implemented storage can include a plurality of identifying data derived from metric names and names of data structures that include metric data.

The query processing system can, prior to communicating the metric name and the name of the data structure to the first computer-implemented system, generate formatted data that includes the metric name and the name of the data structure. This formatted data can be readable by a computer-implemented instructions of the first computer-implemented system. In an example, the formatted data is language agnostic and can be interpreted by the first computer implemented system using its associated computer-implemented instructions that can be executed by one or more processors.

In response to receiving the metric name and the name of the data structure, based on the user generated query and a parsing of the user generated query by the query processing system, the first computer-implemented system can use the metric name and the name of the data structure to identify identifying data linked to the metric name and the name of the data structure. In at least one embodiment, this identifying data is a hash generated by a hashing function that processes the metric name and the name of the data structure. The first computer-implemented system can communicate the identifying data linked to the metric name and the name of the data structure to the query processing system.

The query processing system can use the received identifying data to receive or obtain performance data corresponding to at least one computer implemented service provided by the online service provider. Specifically, the identifying data can be communicated to a second computer-implemented system. This second computer-implemented system includes the performance data linked to the identifying data received by the query processing system. In general, the second computer-implemented system can include performance data linked to a plurality of identifying data. The second computer-implemented system can be a distributed computer-implemented system that includes metric data linked to customer use of computer-implemented systems or services provided by the online service provider. For example, the computer-implemented systems or services can include various computer instance types, such as hardware or software offered as a service to customers of the online service provider. Metric data can be generated based on the use of these various computer instance types. The metric data can be stored in the second computer-implemented system. Metadata such as name information and location information of the metric data stored in the second computer-implemented system can be hosted in the first computer-implemented system.

In one example, the query processing system uses the received identifying data linked to the metric name and the name of the data structure to reference a registry. This registry can contain a list of a plurality of computer-implemented storages associated with the second computer-implemented system. Each of the plurality of the computer-implemented storages can contain metric data. The registry can include identifying information associated with each of the computer-implemented storages. The identifying information can include identifying data linked to metric names and names of data structures, and this identifying information can be used by the query processing system to identify metric data hosted on any particular computer-implemented storage associated with the second computer-implemented system.

Once the query processing system receives the performance data linked to identifying data communicated to the second computer-implemented system, the query processing system and can communicate the performance data to one or more users or customers associated with online service provider in order to fulfill a query processed by the query processing system.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) improving or enabling the processing of queries against metric data, wherein metadata associated with the metric data is stored separately from the metric data; and (2) providing a hybrid SQL language that enhances performance of computer systems by reducing an amount of time required to interrogate computer-implemented system storing metric data and associated metadata.

FIG. 1 illustrates an example system environment 100 that can process queries, according to at least one embodiment. The example system environment 100 can include a computer-implemented system 102. The computer-implemented system 102 can comprise various computational resources, including virtual computer instances, applications, services, processes, web servers, computer storage, database instances, networking components, and so on. In some embodiments, the computer-implemented system 102 can be hosted in the cloud by an online service provider.

The computer-implemented system 102 can comprise hosted multi-tenant provider networks. The computer-implemented system 102 can be associated with a number of networks, such as the Internet and/or one or more private networks. Clients, such as client computing devices or other interfaces, can use the network to interface with the computer-implemented system 102. Clients can include entities or individuals that contract with an operator associated with the computer-implemented system 102 to obtain computational services provided by the operator of the computer-implemented system 102. In some embodiments, the client can be resource owners, resource developers, compliance managers, other users or entities, and so on.

In at least one embodiment, a user can use a user interface to define parameters of the hybrid SQL language, which can be processed by a system of the online service provider to query computer-implemented storage that hosts metric data and metadata of the metric data. For example, the computer-implemented system 102 can include a user interface that allows a user to generate a query 104 or a plurality of such queries. The query 104 can be embedded in an API 106. Alternatively, the query 104 can be generated through a user interface of the computer-implemented system 102. In at least one embodiment, the query 104 includes a hybrid SQL language with user-defined parameters can be embedded in the API 106.

The system 102 can include one or more first computer-implemented systems 108 that include metadata of metric data 110. Furthermore, the system 102 can include one or more second computer-implemented systems 112 that include the metric data 114. The metric data 114 can be distributed over many computer-implemented storages. In some implementations, the metadata includes hash values generated from at least metric data names and data structure names that store the metric data. The data structures can be tables that contain metric data. The tables can have columnar format, where each column can be referred herein as a dimension and have an associated dimension identifier.

The hybrid SQL language of the query 104 can include a plurality of sections or portions. One portion can include a select statement. The select statement allows customers to define both the metric name of the metric data they want to obtain, along with the identification of an aggregate function to be applied to all the observations matching the query. In an example, identification and use of the aggregate function can be optional. Another portion of the hybrid SQL language can include a from statement. The from statement allows users to define a namespace associated with the metric data that they want to obtain. In one example, the namespace is a name of a data structure containing the metric data. In another example, the namespace is the name of a storage location, such as a storage location of the second computer-implemented system 112, containing the metric data. In yet another example, the namespace is the name of a schemeless or a schema defined a table containing the metric data. The table can include one or more columns, and each one of the columns can have an associated identifier related to metric data. As described in the following, the hybrid SQL language can include additional sections or portions.

A user generated query 104, using the hybrid SQL language, can be received by a query processing service 116. The query processing service 116 can be coupled to at least two computer-implemented storages, such as storages associated with the first computer-implemented system 108 and the second computer-implemented system 112. A first of the computer-implemented storages can host metric metadata 110 associated with metric data 114. A second of the computer-implemented storages can host the metric data 114. For example, the second of the computer-implemented storages can be associated with the second computer-implemented system 112. In some examples, a plurality of computer-implemented storages can be used to host the metadata 110. Similarly, in some examples, a plurality of computer-implemented storages can be used to host the metric data 114. The user generated query 104 can include at least a first portion including first data identifying a metric name. This metric name may be associated with performance data corresponding to at least one computer-implemented service provided by the online service provider. Furthermore, the user generated query 104 can include a second portion including a second data identifying a name of a data structure comprising the performance data associated with the metric name identified in the first portion of the query. In at least one embodiment, the performance data can comprise any type of data associated with a computer-implemented system. For example, the computer-implemented system can comprise one or more Internet of things (IoT) devices and the performance data associated the one or more IoT devices can be data generated by the one or more IoT devices, data generated based on analyzed performance or behavior of the one or more IoT devices, and/or data generated based on operation of the one or more IoT devices with other computing devices, such at least one additional IoT device. The one or more IoT devices can include any computing device that can generate data and/or be observed as part of a process to generate data (e.g., metric data or performance data) that can be used for analysis purposes or the like.

The query processing service 116 can parse the received user generated query 104. For example, the query processing service 116 can parse the query 104 to determine the metric name from the first data and the name of the data structure from the second data. In an example, the name of the data structure is associated with a table that hosts metric data. The query processing service 116 can communicate the metric name and the name of the data structure to the first computer-implemented storage associated with the first computer-implemented system 108. The first computer-implemented storage can include the metadata 110 linked to the metric data 114 stored in a second computer-implemented storage, such as storage of the second computer-implemented system 112. In at least one example, the metadata 110 included in the first computer-implemented storage includes identifying data linked to the metric name and the name of the data structure. The identifying data can be derived from the metric name and the name of the data structure. For example, the identifying data can be a hash derived from the metric name and the name of the data structure. The first computer-implemented storage can include a plurality of identifying data derived from metric names and names of data structures that include metric data.

The query processing service 116 can, prior to communicating the metric name and the name of the data structure to the first computer-implemented system 108, generate formatted data that includes the metric name and the name of the data structure. This formatted data can be readable by a computer-implemented instructions of the first computer-implemented system 108. In an example, the formatted data is language agnostic and can be interpreted by the first computer implemented system 108 using its associated computer-implemented instructions that can be executed by one or more processors.

In response to receiving the metric name and the name of the data structure, based on the user generated query 104 and a parsing of the user generated query 104 by the query processing service 116, the first computer-implemented system 108 can use the metric name and the name of the data structure to identify identifying data linked to the metric name and the name of the data structure. In at least one embodiment, the identifying data linked to the metric name and the name of the data structure is included in the metric data 110. In at least one embodiment, this identifying data is a hash generated by a hashing function that processes the metric name and the name of the data structure. The first computer-implemented system 108 can communicate the identifying data linked to the metric name and the name of the data structure to the query processing service 116.

The query processing service 116 can use the received identifying data to receive or obtain performance data corresponding to at least one computer implemented service provided by the computer-implement system 102 and/or an online service provider associated with the computer-implemented system 102. In at least one embodiment, the performance data is associated with the metric data 114. Specifically, the identifying data can be communicated to the second computer-implemented system 112. This second computer-implemented system 112 includes the performance data (i.e., metric data 114) linked to the identifying data received by the query processing service 116 from the first computer having implement a system 108. In general, the second computer-implemented system 112 can include performance data linked to a plurality of identifying data. The second computer-implemented system 112 can be a distributed computer-implemented system that includes metric data 114 (i.e., performance data) linked to customer use of computer-implemented systems or services provided by the online service provider and/or the computer-implement system 102. For example, the computer-implemented systems or services can include various computer instance types, such as hardware or software offered as a service to customers of the online service provider. The metric data 114 can be generated based on the use of these various computer instance types. The metric data 114 can be stored in the second computer-implemented system 112. The metric metadata 110, such as name information and location information of the metric data 114 stored in the second computer-implemented system 112, can be hosted in the first computer-implemented system 108.

In at least one embodiment, the query processing service 116 uses the received identifying data linked to the metric name and the name of the data structure to reference a registry. This registry can contain a list of a plurality of computer-implemented storages associated with the second computer-implemented system 112. Each of the plurality of the computer-implemented storages can contain metric data 114. The registry can include identifying information associated with each of the computer-implemented storages. The identifying information can include identifying data linked to metric names and names of data structures, and this identifying information can be used by the query processing service 116 to identify metric data hosted on any particular computer-implemented storage associated with the second computer-implemented system 112.

Once the query processing service 116 receives the performance data (i.e., metric data 114) linked to identifying data communicated to the second computer-implemented system, the query processing service 116 and can communicate the performance data to one or more users or customers associated with online service provider in order to fulfill the query 104 processed by the query processing service 116.

Figure 2:
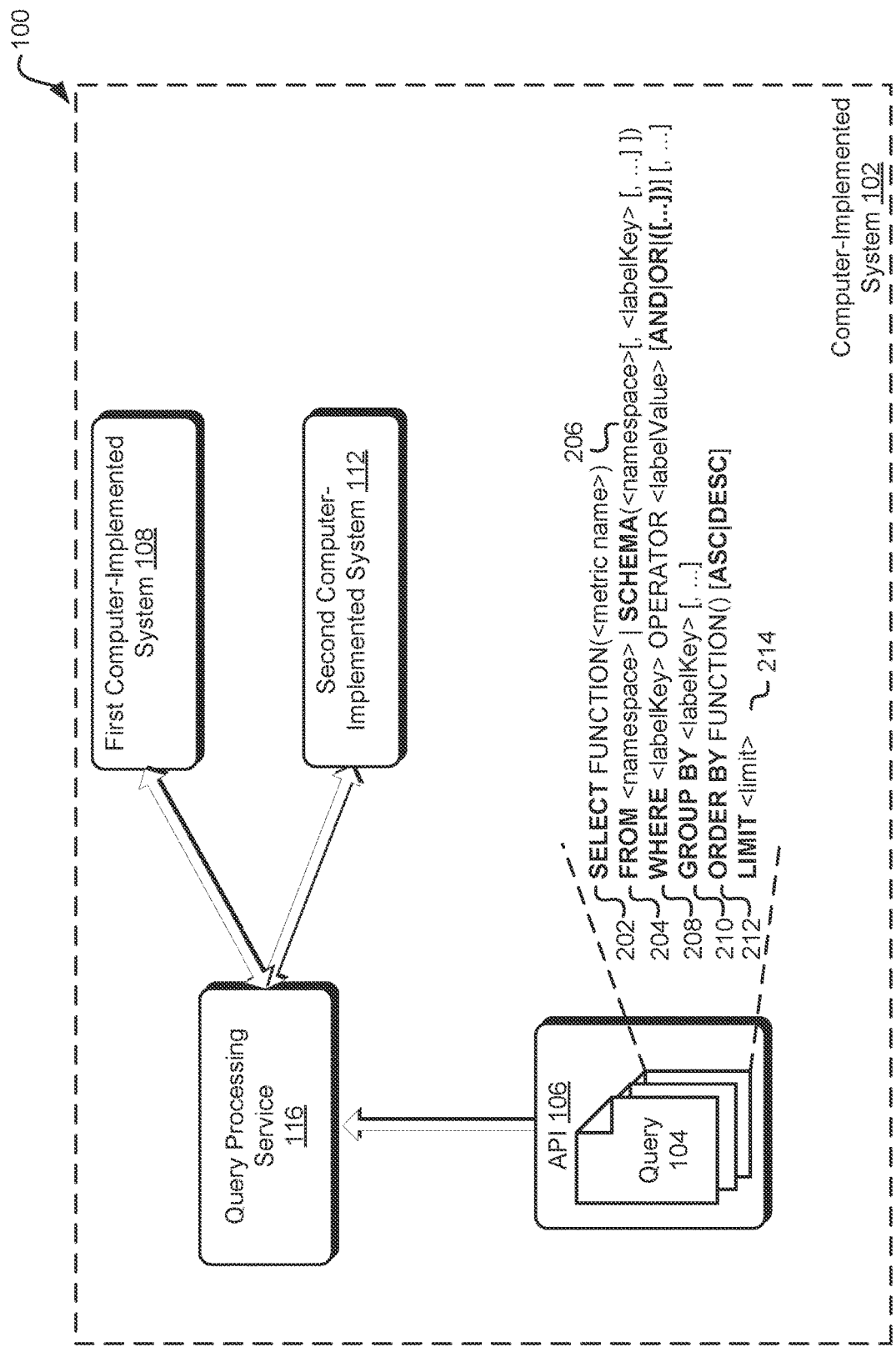
FIG. 2 illustrates additional details of the query specification used by the example system environment, according to at least one embodiment.

FIG. 2 illustrates additional details of the query 104 used by the example system environment 102, according to at least one embodiment. In at least one embodiment, the query 104 can comprise multiple portions or segments 202-214. Each of the segment 202-214 can be defined by a user or customer associated with the computer-implemented system.

The portion 202 of the query 104 can be defined by the user to identify a name or type of metric implemented by the system. Furthermore, the portion 202 can include the name of a function. In at least one embodiment, the specified function is to use to aggregate metric data, which may be associated with one or more time buckets determined by a provided period(s). Also the portion 202 can specify the name of the metric data location to query. In at least one embodiment, the supported functions include: AVG, COUNT, MAX, MIN, and SUM. AVG calculates the average of the observations (e.g., metric data/performance data) matched by the query 104. COUNT returns the count of the observations matched by the query 104. MAX returns the maximum value of the observations matched by the query 104. MIN returns the minimum value of the observations matched by the query 104. SUM calculates the sum of the observations matched by the query 104. Example formatting for portion 202 include: SELECT SUM(ReturnedItemCount) FROM "MyTable" and SELECT AVG(Availability) FROM "My Service". The string in the parentheticals corresponds to one of may metrics offered by the system and that generate metric data. Such metrics can include: CPUUtilization, which generates a percentage of allocated compute units that are currently in use on an instance. This metric identifies the processing power required to run an application on a selected instance. Depending on the instance type, tools in the operating system can show a different percentage than metrics system when the instance is not allocated a full processor core; NetworkIn: generates the number of bytes received by the instance on all network interfaces. This metric identifies the volume of incoming network traffic to a single instance. The number reported is the number of bytes received during a period; and DiskReadBytes: Bytes read from all instance store volumes available to the instance. This metric is used to determine the volume of the data the application reads from the hard disk of the instance. This can be used to determine the speed of the application. Many other metrics can be offered and are implemented by the computer-implemented system 102.

The portion 204 of the query 104 can be defined by the user to identify a source, such as a data source, associated with the name of the metric data to query. A user can specify either the metric namespace that contains the metric data that is to be queried, or a table function. Examples of metric namespaces include predetermined namespaces determined by an online service provider, such as the online service provider associated with the computer-implemented system 102, and/or customer created metric namespaces for metric data.

The portion 206 of the query 104 can be defined by the user to identify one or more dimensions associated with the namespace. The portion 206 can be used by a user to scope down the query results to the metrics that exactly match a list of dimensions, or to metrics that have no dimensions. At least one embodiment, the portion 206 it can contain at least one argument, and this argument can be used for the metric namespace being queried. If the user simply specifies the namespace argument, the results are scoped down to metrics that do not have any dimensions. Example formatting for the portion 206 include: FROM SCHEMA(namespace, dimensionKey1) determines if the metric has only this single specific dimension present. FROM SCHEMA(namespace, dimensionKey1, dimensionKey2, . . . ) determines if the metric has only these specific dimensions present. FROM SCHEMA(namespace) determines if the metric has no dimensions. FROM namespace determines if the metric has no constraints on its schema. Thus, if the query uses the portion 206 with additional arguments, the additional arguments after the namespace argument should be label keys, such as dimension names. When the user includes one or more of these label keys, the metric data results are scoped down to only those metrics that have that exact set of dimensions. The order of these label keys does not matter. Other examples include: SELECT AVG(CPUUtilization) FROM "XYX/ECC2" matches all CPUUtilization metrics in the XYX/ECC2 namespace, no matter their dimensions, and returns a single aggregated time series; SELECT AVG (CPUUtilization) FROM SCHEMA("XYX/ECC2") matches only the CPUUtilization metrics in the XYX/ECC2 namespace that do not have any dimensions defined; SELECT AVG(CPUUtilization) FROM SCHEMA("XYX/ ECC2", InstanceId) matches only the CPUUtilization metrics that were reported to system with exactly one dimension, InstanceId; SELECT SUM(RequestCount) FROM SCHEMA("XYX/Application", LoadBalancer, AvailabilityZone) matches only the RequestCount metrics that were reported to the system from XYX/Application with exactly two dimensions, LoadBalancer and AvailabilityZone.

The portion 208 of the query 104 can be defined by the user to filter the metric data results of those metrics that match the user's specified expression using specific label values for one or more label keys. For example, WHERE InstanceType='c3.4xlarge' filters the results to only c3.4xlarge instance types, and WHERE InstanceType !='c3.4xlarge' filters the results to all instance types except c3.4xlarge. The WHERE clause supports the at least following operators: =label value must match the specified string; !=label value must not match the specified string; and AND both conditions that are specified must be true to match. The user can use multiple AND keywords to specify two or more conditions.

The portion 210 of the query 104 can be defined by the user to group query results into multiple groups of metric data, each one corresponding to a different value for the specified label key or keys. For example, using GROUP BY InstanceId returns a different set of metric data for each value of InstanceId. Using GROUP BY ServiceName, Operation creates a different set of metric data for each possible combination of the values of ServiceName and Operation. With a GROUP BY clause, by default the results are ordered in alphabetical ascending order, using the sequence of labels specified in the GROUP BY clause. Therefore, a user can change the order of the metric data results by including an ORDER BY clause in the query 104.

The portion 212 of the query 104 can be defined by the user to order returned metric data based on an identified function. The order is based on the values found by the Function that the user specify in the ORDER BY clause. The Function is used to calculate a single scalar value from each returned metric data, and that value is used to determine the order. The user can also specify, within the portion 210, also specify whether to use ascending ASC or descending DESC order. If user omits the foregoing, the default is ascending ASC. For example, adding an ORDER BY MAX( ) DESC clause orders the metric data results by the maximum data point observed within a specified time range, in descending order: meaning that the metric data that has the highest maximum data point is returned first.

In at least one embodiment, the valid functions to use within an ORDER BY clause are AVG( ), COUNT( ), MAX( ), MIN( ), and SUM( ). When the user uses an ORDER BY clause with a LIMIT clause, such as in portion 214, the resulting query is a "Top N" query. ORDER BY is also useful for queries that might return a large number of metric data, because each query can return no more than 500 metric data hits. If a query matches more than 500 metric data hits, and the user specifies an ORDER BY clause, the metric data hits are sorted and then the 500 metric data hits that come first in the sort order are the ones that are returned in response to the query 104.

The portion 214 of the query 104 can be defined by the user to limit the number of individual metric data units returned by the query 104 to the value specified by the user. In at least one embodiment, the maximum value that a user can specify is 500, and a query that does not specify a LIMIT can also return no more than 500 time series. As described, using a LIMIT clause with an ORDER BY clause returns a "Top N" query.

Figure 3:
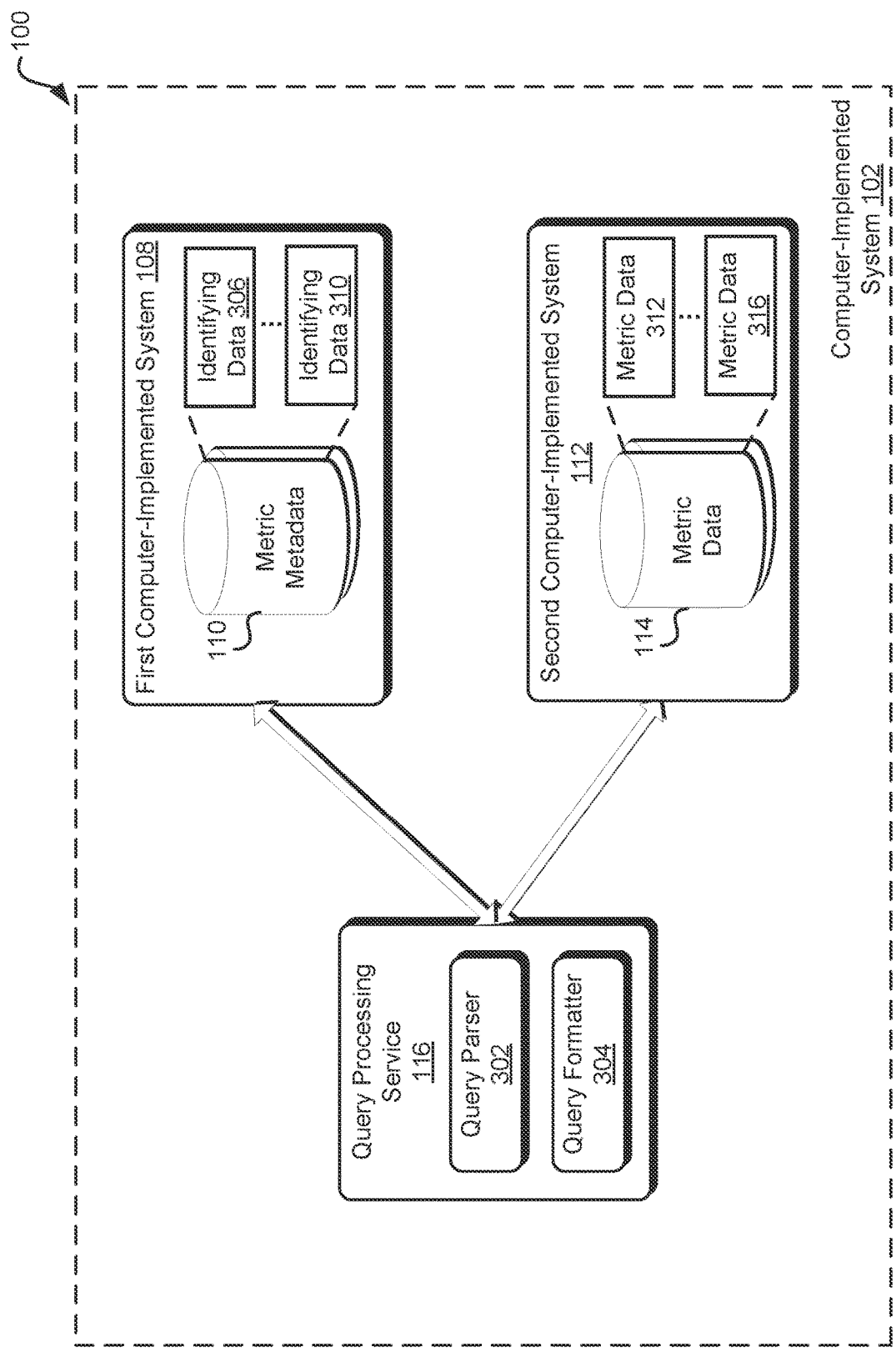
FIG. 3 illustrates additional details of a query processing service, a first computer-implemented system, and a second computer-implemented system of the example system environment that can process queries, according to at least one embodiment, according to at least one embodiment.

FIG. 3 illustrates additional details of the query processing service 116, the first computer-implemented system 108, and the second computer-implemented system 112 of the example system environment 100 that can process queries, according to at least one embodiment. In at least one embodiment, the query processing service 116 includes a query parser 302 and a query formatter 304. The query parser 302 can parse a received query, such as the query 104, to determine user-defined portions or segments included in the query 104. Such user-defined portions or segments are described with reference to FIG. 2. In at least one embodiment, the query parser 302 determines the user-defined portions or segments and can generate, through the query processing service 116, and can generate communications to one or more of the first computer-implemented system 108 and the second computer-implement a system 112.

At least one embodiment, the query formatter 304 is leveraged by the query processing service 116 to reformat one or more user-defined portions or segments included in the query 104 into formatted data that capable of being processed by the first computer-implement a system 108. In at least one embodiment, the formatted data includes a metric name and a name of a data structure, both identified in the query 104. In at least one embodiment, the formatted data is language agnostic and processable by the first computer-implemented system 108.

FIG. 3 further illustrates that the metric data 110 includes a plurality of identifying data 306-310. In at least one embodiment, the identifying data 306 is derived from a first metric name and a first name of the data structure including metric data associated with the first metric name. Similarly, the identifying data 308 is derived from a second metric name and a second name of the data structure including metric data associated with the second metric name. Finally, the identifying data 310 is derived from a third metric name and a third name of the data structure including the metric data associated with the third metric name. Additional identifying data included in the metric data 110 can be determined in a similar manner. In at least one embodiment, at least some of the identified data 306-310 are hash values. These hash values can be determined or calculated based on a hashing function that receives a metric name and the name of a data structure.

Furthermore, in at least one embodiment, the second computer-implemented system 112 includes a plurality of metric data 312-316 associated with the metric data 314. In at least one embodiment, the metric data 312 can be retrieved, by the query processing service 116, using the identifying data 306. Similarly, in at least one embodiment, the metric data 314 can be retrieved by the query processing service 116 using the identified data 308. In addition, at least one embodiment, the metric data 316 can be retrieved by the query processing service 116 using the identifying data 310.

In at least one embodiment, the query processing service 116 receives identifying data, based on one or more queries for metric data, from the first computer-implemented system 108 and uses the received identifying data to interrogate the second computer-implemented system 112 to obtain or receive associated metric data. Specifically, in at least one embodiment, the second computer-implemented system 112 leverages the received identifying data to locate metric data associated with the received identifying data. The located metric data can be returned to the query processing service 116 and used by the query processing service 116 to respond to one or more queries.

Figure 4:
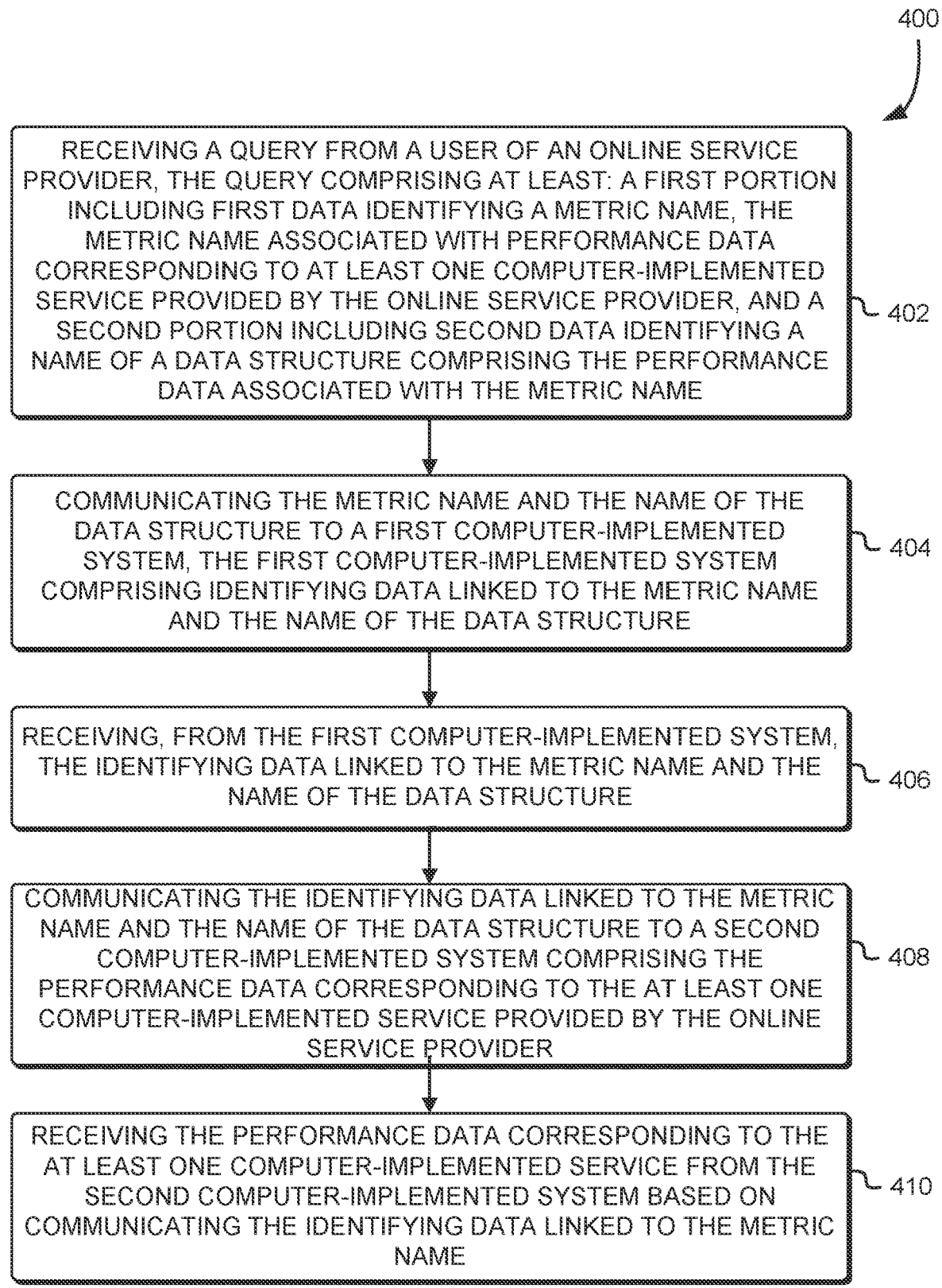
FIG. 4 illustrates an example flow diagram that may be associated with one or more of the described system environments to process queries on metric data, according to at least one embodiment.

FIG. 4 illustrates an example flow diagram 400 that may be associated with one or more of the described system environments to perform to process queries for metric data, such as performance data associated with a computer-implemented system, according to at least one embodiment. In some implementations, the acts of the flow diagram 400 are executed by one or more computing devices of the example system environments described herein. The example system environments may execute computer-executable instructions incorporating at least some of the processing acts of the flow diagram 400 to provide queries for metric data, such as performance data associated with a computer-implemented system according to at least one of the embodiments described herein.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules might be implemented in software, in firmware, in special-purpose digital logic, and any combination thereof.

At 402, a query is received from a user of an online service provider, the query comprising at least: a first portion including first data identifying a metric name, the metric name associated with performance data corresponding to at least one computer-implemented service provided by the online service provider, and a second portion including second data identifying a name of a data structure comprising the performance data associated with the metric name. In at least one embodiment, the query is associated with the query 104 and generated by a customer of an online service provider. In at least one embodiment, the query is received by the computer-implemented system 102. The at least one embodiment, the query is received by the query processing service 116.

At 404, the metric name and the name of the data structure are communicated to a first computer-implemented system, the first computer-implemented system comprising identifying data linked to the metric name and the name of the data structure. In at least one embodiment, the metric name and the name of the data structure are included in a query, such as the query 104. In at least one embodiment, the metric name and the name of the data structure are communicated to a system of the computer-implemented system 102. In at least one embodiment, the metric name and the name of the data structure are communicated to the first computer-implement the system 108 that comprises the metric data 110. In at least one embodiment, the metric name and the name of the data structure are included in the metric metadata 110. In at least one embodiment, the metric name and the name of the data structure included in the metric metadata 110 are identified by a metric identifier, such as a metric identifier that is a hash value generated by a hash function that receives the metric name and the name of the data structure. In at least one embodiment, prior to the processing of 404, the query can be parsed to determine the metric name from the first data and the name of the data structure from the second data. In at least one embodiment, the first data is associated with a first portion of the query and the second data is associated with a second portion of the query, where the query can include multiple portions or segments each defining particulars of the query. Example sections or portions associated with a query are illustrated in FIG. 2.

At 406, in response to communicating the metric name and the name of the data structure, the identifying data linked to the metric name and the name of the data structure is received from the first computer-implemented system. In at least one embodiment, the identifying data linked to the metric name and the name of the data structure was generated prior to the first computer-implemented system receiving the metric name and the name of the data structure from the query processing service 116. For example, the identifying data linked to the metric name and the name of the data structure can be generated when metric data is stored a data structure hosted by computer-implemented storage, such as the second computer-implemented system 112. In at least one embodiment, data structures hosted by the second computer-implemented system 112 can be files, database tables, etc.

At 408, the identifying data linked to the metric name and the name of the data structure is communicated to a second computer-implemented system comprising the performance data corresponding to the at least one computer-implemented service provided by the online service provider. In at least one embodiment, the identifying data is communicated to the second computer-implemented system 112. In at least one embodiment, the identifying data is communicated to the second computer-implemented system via the query processing service 116. At least one embodiment, the second computer-implemented system 112 can use the identifying data linked to the metric name and the name of the data structure to determine a location of the performance data, which is stored by the second computer-implemented system 112 and the associated data structure identified by the identifying data linked to the metric name and the name of the data structure.

At 410, the performance data corresponding to the at least one computer-implemented service is received from the second computer-implemented system based on communicating the identifying data linked to the metric name. In at least one embodiment, the performance data is received by the query processing service 116. It was in one embodiment, the performance data comprises metric data stored by the second computer-implemented system. In at least one embodiment, the performance data is used to respond to a query, such as the query 104.

Figure 5:
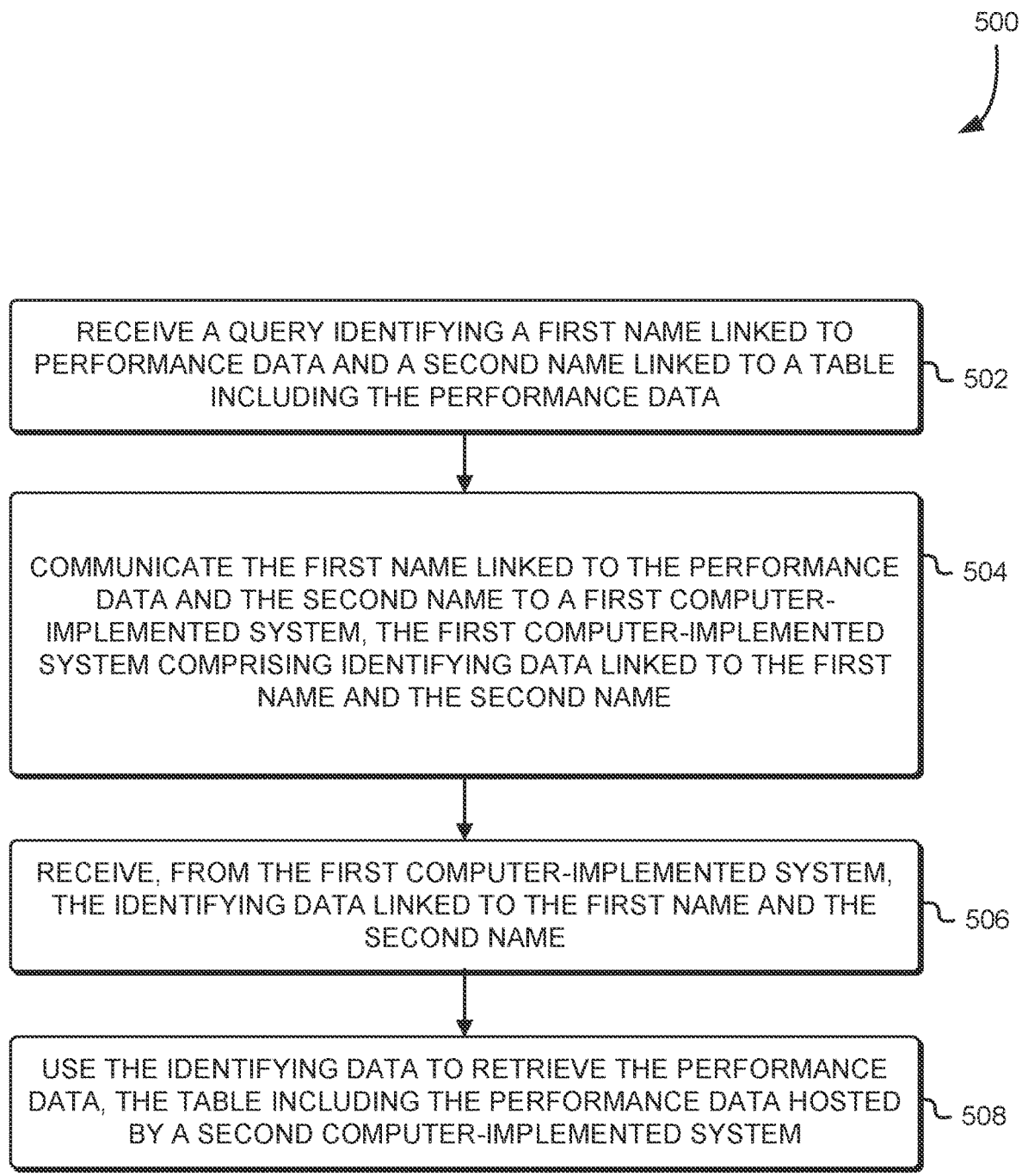
FIG. 5 illustrates an example flow diagram that may be associated with one or more of the described system environments to process queries on metric data, according to at least one embodiment.

FIG. 5 illustrates an example flow diagram 500 that may be associated with one or more of the described system environments to perform to process queries for metric data, such as performance data associated with a computer-implemented system, according to at least one embodiment. In some implementations, the acts of the flow diagram 500 are executed by one or more computing devices of the example system environments described herein. The example system environments may execute computer-executable instructions incorporating at least some of the processing acts of the flow diagram 500 to provide queries for metric data, such as performance data associated with a computer-implemented system according to at least one of the embodiments described herein.

At 502, a query is received identifying a name linked to performance data and a table name of a table including the performance data. In at least one embodiment, the query corresponds to the query 104, and the query is received by the query processing service 116 and/or the computer-implemented system 102. In at least one embodiment, the name linked to the performance data is a metric name and the performance data corresponds to the use of one or more computer-implemented instances associated with the computer-implemented system 102. In at least one embodiment, the performance data is metric data. In at least one embodiment, the table is a data structure. In at least one embodiment, the table is hosted by the second computer-implemented system 112 and includes performance data.

At 504, the name linked to the performance data and the table name are communicated to a first computer-implemented system, the first computer-implemented system comprising identifying data linked to the name and the table name. At least one embodiment, the first computer-implemented system corresponds to the first computer-implemented system 108.

At 506, the identifying data linked to the name and the table name is received from the first computer-implemented system. At least one embodiment, the identifying data is received from the first computer-implemented system 108. At least one embodiment, the identifying data is a hash value generated based on the name linked to the performance data and the table name. In at least one embodiment, the name linked to the performance data is a metric name. At least one embodiment, the table name corresponds to a database table name comprising the performance data. At least one embodiment, the identifying data is associated with the metric metadata 110 of the first computer-implemented system 108.

At 508, the identifying data is used to retrieve the performance data, the table including the performance data hosted by a second computer-implemented system. In at least one embodiment, the second computer-implemented system corresponds to the second computer-implemented system 112. In at least one embodiment, the identifying data is used by the second computer-implemented system 112 to relocate the table including the performance data.

Figure 6:
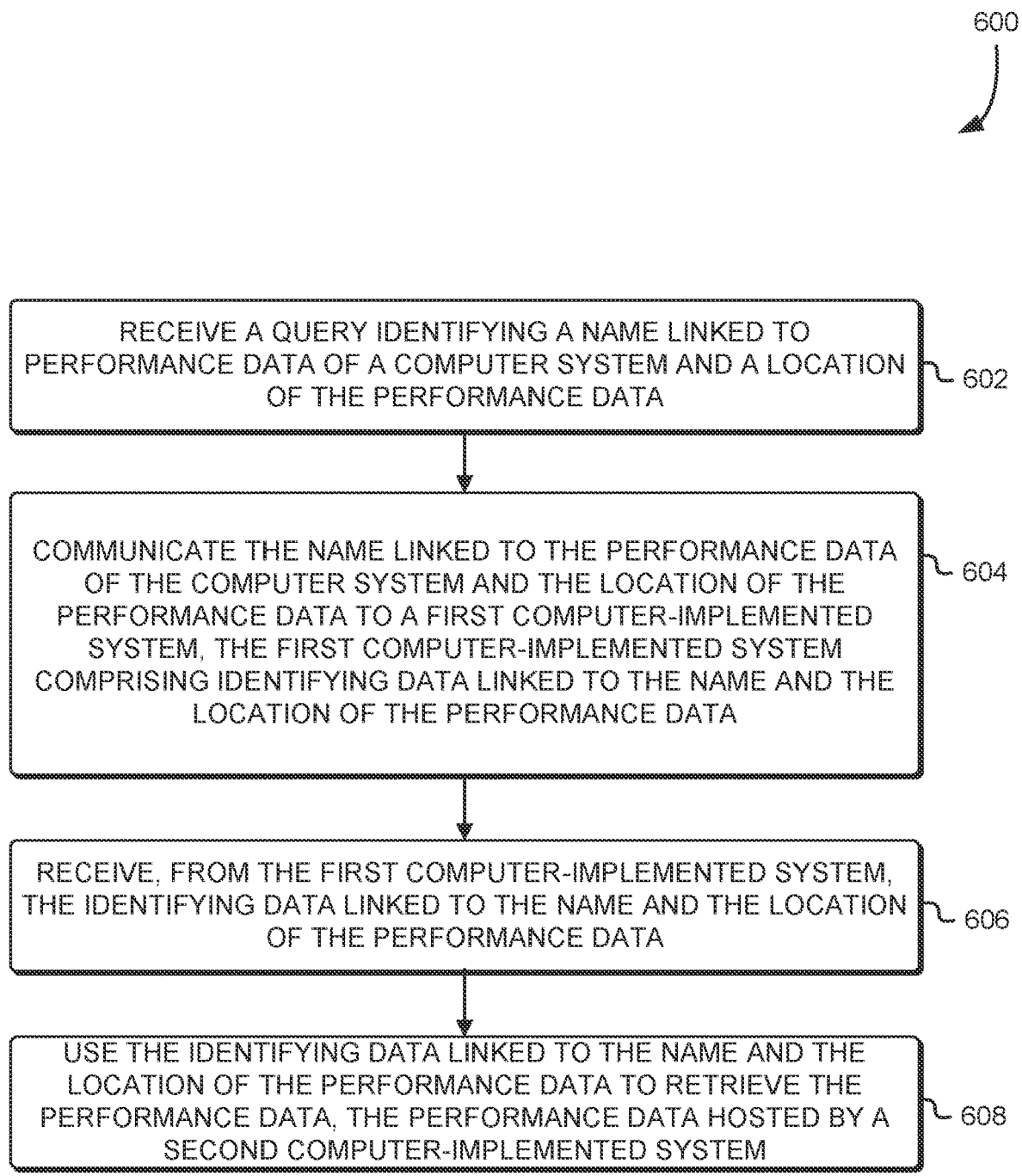
FIG. 6 illustrates an example flow diagram that may be associated with one or more of the described system environments to process queries on metric data, according to at least one embodiment.

FIG. 6 illustrates an example flow diagram 600 that may be associated with one or more of the described system environments to perform to process queries for metric data, such as performance data associated with a computer-implemented system, according to at least one embodiment. In some implementations, the acts of the flow diagram 600 are executed by one or more computing devices of the example system environments described herein. The example system environments may execute computer-executable instructions incorporating at least some of the processing acts of the flow diagram 600 to provide queries for metric data, such as performance data associated with a computer-implemented system according to at least one of the embodiments described herein.

At 602, a query is received identifying a name linked to performance data of a computer system and a location of the performance data. In at least one embodiment, the received query corresponds to the query 104. At least one embodiment, the performance data is metric data generated based on use of the computer system. At least one embodiment, the computer system can be comprised or associated with one or more services, entities, applications, software, and/or hardware, of a computer-implemented system 102.

At 604, the name linked to the performance data of the computer system and the location of the performance data are communicated to a first computer-implemented system, the first computer-implemented system comprising identifying data linked to the name and the location of the performance data. In at least one embodiment, a computer-implemented system comprising the identifying data corresponds to the first computer-implemented system 108.

At 606, receive, from the first computer-implemented system, the identifying data linked to the name and the location of the performance data. In at least one embodiment, the identifying data is received by the query processing service 116.

At 608, the identifying data linked to the name and the location of the performance data is used use to retrieve the performance data, the performance data hosted by a second computer-implemented system. In at least one embodiment, the query processing service 116 communicates the identifying data to the second computer-Emperor system 112 in order to enable the system 112 to locate and retrieve a performance data.

Figure 7:
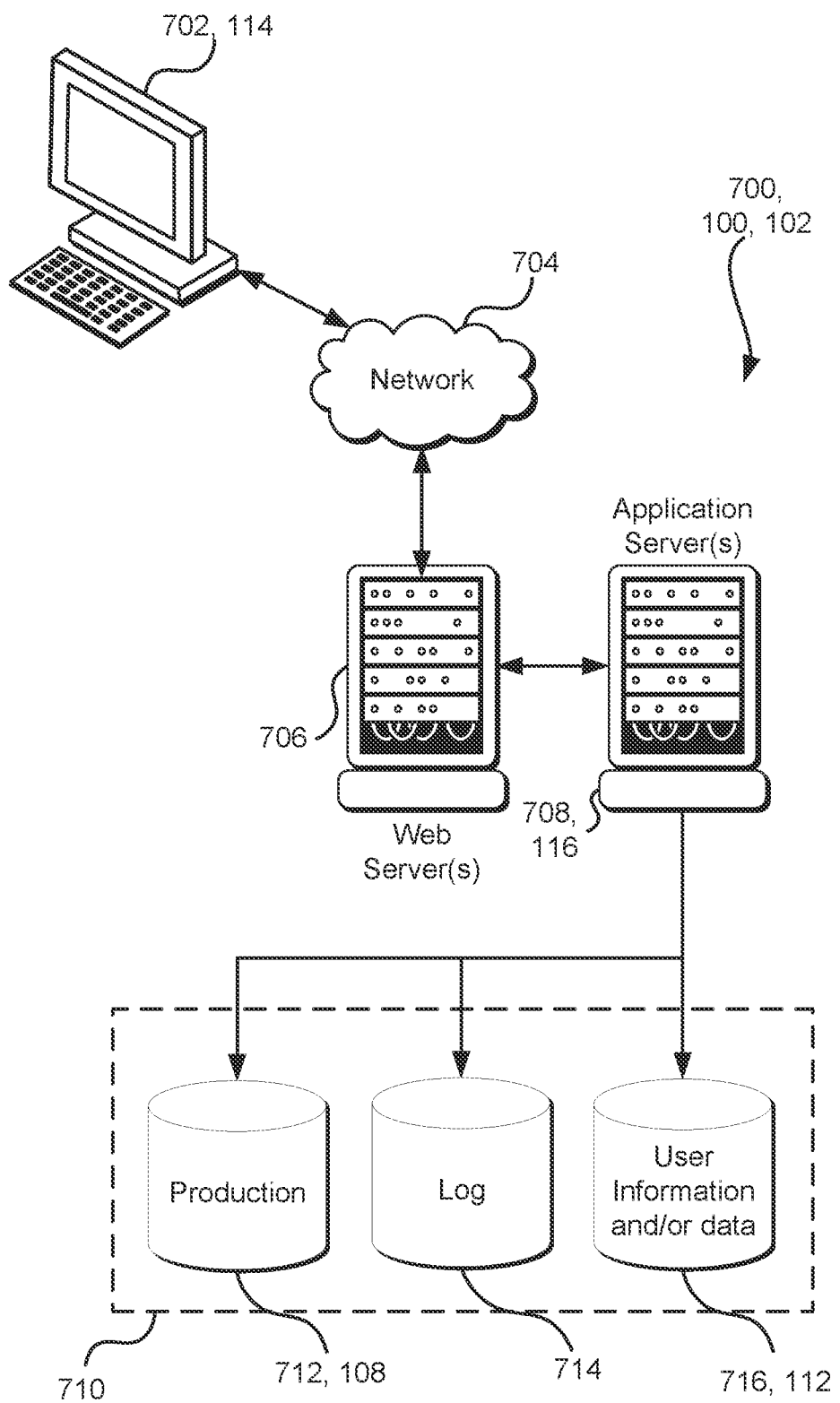
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a query from a user computing device at a computer-implemented system of an online service provider, the query comprising at least:
      a first portion including first data identifying a metric name, the metric name associated with performance data corresponding to at least one computer-implemented service provided by the online service provider, and
      a second portion including second data identifying a name of a data structure comprising the performance data associated with the metric name;
   parsing the query to determine the metric name from the first data and the name of the data structure from the second data;
   communicating the metric name and the name of the data structure to a first computer-implemented system, the first computer-implemented system comprising identifying data linked to the metric name and the name of the data structure, the identifying data derived by a function executed to process the metric name and the name of the data structure, the first computer-implemented system to use the communicated metric name and the name of the data structure to determine the identifying data linked to the metric name and the name of the data structure;
   in response to communicating the metric name and the name of the data structure, receiving, from the first computer-implemented system, the identifying data linked to the metric name and the name of the data structure;
   communicating the identifying data linked to the metric name and the name of the data structure to a second computer-implemented system comprising the performance data corresponding to the at least one computer-implemented service provided by the online service provider; and
   receiving the performance data corresponding to the at least one computer-implemented service from the second computer-implemented system based on communicating the identifying data linked to the metric name and the name of the data structure.

2. The computer-implemented method according to claim 1, wherein the first portion of the query further includes a function name selected from a plurality of predetermined function names, each of the plurality of function names linked to a processing to be performed on the performance data received from the second computer-implemented system, and wherein the method further comprises performing at least one operation on the performance data based on the processing linked to the function name included in the first portion of the query.

3. The computer-implemented method according to claim 1, further comprising, prior to communicating the metric name and the name of the data structure to the first computer-implemented system, associating the metric name and the name of the data structure in formatted data, the formatted data readable by computer-implemented executable instructions that when executed by one or more processors associated with the first computer-implemented system allows the first computer-implemented system to determine the metric name and the name of the data structure included in the formatted data.

4. The computer-implemented method according to claim 1, wherein the second portion further includes third data identifying at least one dimension identifier in the data structure comprising the performance data associated with the metric name, and wherein parsing the query determines the at least one dimension identifier in the data structure and communicating the metric name and the name of the data structure to the first computer-implement system comprises including the at least one dimension identifier with the metric name and the name of the data structure.

5. A system, comprising:
   one or more processors; and
   memory that stores computer-executable instructions that when executed by the one or more processors cause the system to:
      receive a query associated with an application programming interface (API) that embeds user-defined parameters included at least a name linked to performance data of a computer system and a location of the performance data;
      generate formatted data based the query, the formatted data including at least the name linked to the performance data of the computer system and the location of the performance data;
      communicate the formatted data including the name linked to the performance data of the computer system and the location of the performance data to a first computer-implemented system, the first computer-implemented system comprising identifying data derived from the name and the location of the performance data and including associated computer-implemented instructions that are executed by the first computer-implemented system to interpret the formatted data;
      receive, from the first computer-implemented system, the identifying data derived from the name and the location of the performance data; and
      use the identifying data derived from the name and the location of the performance data to retrieve the performance data, the performance data hosted by a second computer-implemented system.

6. The system according to claim 5, wherein the performance data of the computer system is determined from use of one or more processors associated with the computer system, use of one or more data storage entities associated with the computer system, or network traffic associated with the computer system.

7. The system according to claim 5, wherein the first computer-implemented system comprises a plurality of hash values, the identifying data comprising at least one of the plurality of hash values, and the at least one of the plurality of hash values determined from a hashing formula that receives one or more strings corresponding to the name and location of the performance data.

8. The system according to claim 5, wherein the query further identifies a function name linked to processing to be performed on the performance data retrieved from the second computer-implemented system, and wherein the computer-executable instructions that when executed by the one or more processors are further to cause the system to perform at least one operation on the performance data based on the processing linked to the function name identified the query.

9. The system according to claim 8, wherein the computer-executable instructions that when executed by the one or more processors further cause the system to perform at least two operations on the performance data based on the processing linked to the function name identified the query.

10. The system according to claim 5, wherein the performance data comprises performance data of the computer system determined over a period of time and the performance data comprises a plurality of performance data units each collected based on a predetermined time interval period.

11. The system according to claim 5, wherein using the identifying data linked to the name and the location of the performance data to retrieve the performance data comprises referencing a data structure comprising an identifier of at least one computer-implemented data storage and a list of data hosted by the at least one computer-implemented data storage, the retrieved performance data identified in the list of data hosted by the at least one computer-implemented data storage.

12. The system according to claim 5, wherein the query identifying the name linked to the performance data of the computer system and the location of the performance data comprises a plurality of sections, a first section of the plurality of sections comprising the name, a second section of the plurality of sections comprising the location of the performance data, and a third section of the plurality of sections comprising an operator and an identifier string associated with the location of the performance data.

13. A non-transitory computer-readable storage medium storing thereon executable instructions that, as a result of being executed by one or more processors of a computer system, cause the computer system to:
receive a query associated with an application programing interface (API) that embeds user-defined parameters included at least a first name linked to performance data and a second name linked to a table including the performance data;
generate formatted data based the query, the formatted data including at least the first name linked to the performance data and the second name linked to a table including the performance data;
communicate the formatted data including the first name linked to the performance data and the second name to a first computer-implemented system, the first computer-implemented system comprising identifying data linked to the first name and the second name and including associated computer-implemented instructions that are executed by the first computer-implemented system to interpret the formatted data;
receive, from the first computer-implemented system, the identifying data linked to the first name and the second name; and
use the identifying data to retrieve the performance data, the table including the performance data hosted by a second computer-implemented system.

14. The non-transitory computer-readable storage medium according to claim 13, wherein the query identifying the first name linked to the performance data and the second name linked to the table including the performance data comprises a plurality of sections, a first section of the plurality of sections comprising the first name, a second section of the plurality of sections comprising the second name, and a third section of the plurality of sections comprising an operator and an identifier string associated with the table.

15. The non-transitory computer-readable storage medium according to claim 13, wherein the performance data is determined from use of one or more processors associated with a computer system, use of one or more data storage entities associated with the computer system, or network traffic associated with the computer system.

16. The non-transitory computer-readable storage medium according to 13, wherein the query further identifies a function name linked to processing to be performed on the performance data, and wherein the executable instructions that, as a result of being executed by the one or more processors of the computer system, cause the computer system to further perform at least one operation on the performance data based on the processing linked to the function name identified the query.

17. The non-transitory computer-readable storage medium according to claim 16, wherein the executable instructions that, as a result of being executed by the one or more processors of the computer system, cause the computer system to perform at least two operations on the performance data based on the processing linked to the function name identified the query.

18. The non-transitory computer-readable storage medium according to claim 13, wherein the first computer-implemented system comprises a plurality of hash values, the identifying data comprising at least one of the plurality of hash values, and the at least one of the plurality of hash values determined from a hashing formula that receives one or more strings corresponding to the first name and the second name linked to the table including the performance data.

19. The non-transitory computer-readable storage medium according to claim 13, wherein the performance data comprises performance data of a computer system determined over a period of time and the performance data comprises a plurality of performance data units each collected based on a predetermined time interval period.

20. The non-transitory computer-readable storage medium according to claim 13, wherein the executable instructions that, as a result of being executed by the one or more processors of the computer system, cause the computer system to associate the first name linked to the performance data and the second name in formatted data, the formatted data readable by computer-implemented instructions that when executed by one or more processors associated with the first computer-implemented system enable the first computer-implemented system to determine the first name linked to the performance data and the second name included in the formatted data.

* * * * *